United States Patent [19]

Cawley et al.

[11] 4,006,930
[45] Feb. 8, 1977

[54] MANIPULATOR FOR HOLLOW OBJECTS

[75] Inventors: William E. Cawley; Charles E. Frantz, both of Richland, Wash.

[73] Assignee: The United States of America as represented by the United States Energy Research and Developmnent Administration, Washington, D.C.

[22] Filed: Mar. 15, 1961

[21] Appl. No.: 96,051

[52] U.S. Cl. .................................. 294/93; 29/234; 29/252; 29/283; 294/99 R
[51] Int. Cl.² ........................................ A25B 11/00
[58] Field of Search ................. 294/93, 99; 29/202, 29/235, 236, 252, 255, 282, 283, 234, 426, 427

[56] References Cited

UNITED STATES PATENTS

| 1,721,155 | 7/1929 | Johnson | 29/234 |
| 2,621,867 | 12/1952 | Grettve | 29/252 |
| 2,628,420 | 2/1953 | Skilling | 29/252 |

*Primary Examiner*—Harold Tudor
*Attorney, Agent, or Firm*—Dean E. Carlson; Arthur A. Churm; Edgar J. Werlich

[57] ABSTRACT

A device for gripping the interior of a tubular object to pull it out of a body in which it has become stuck includes an expandable rubber tube having a plurality of metal cables lodged in the exterior of the rubber tube so as to protrude slightly therefrom, means for inflating the tube and means for pulling the tube longitudinally of the tubular object.

3 Claims, 4 Drawing Figures

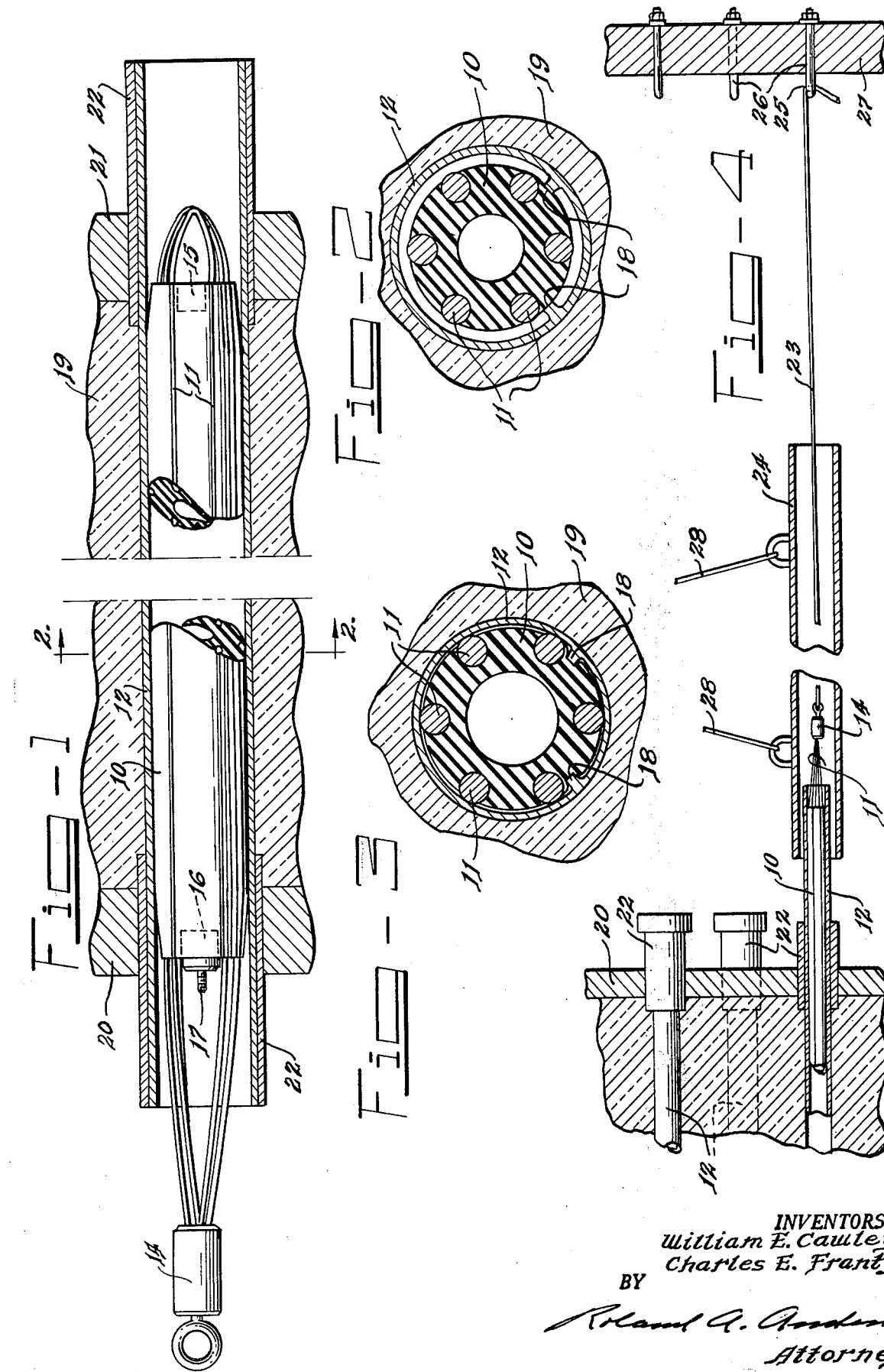

so as to protrude slightly therefrom, extending longitudinally of the rubber tube throughout the length thereof, and being equally spaced from one another about the exterior of the rubber tube so as to define substantial circumferential spaces between said cables for the full length of said tube, said cables being flexible to permit substantial flexure of said device.

2. The device specified in claim 1, the cables extending somewhat beyond the said one end of the rubber tube so as to loop thereover and be joined to one another in pairs, the cables also extending beyond the said other end of the rubber tube, the device further comprising an end fitting applied to the cables well beyond the said other end of the rubber tube.

3. A device for dislodging a tubular object from a block in which it is lodged, said device comprising a rubber tube closed at both ends, a plurality of longitudinal wire cables spaced evenly about the outer circumference of said tube so as to define substantial circumferential spaces between said cables for the full length of said tube, said cables being flexible to permit substantial flexure of the device, means for inflating the tube, and means for applying a force to the wire cables in the direction the tubular object is to be displaced.

* * * * *

MANIPULATOR FOR HOLLOW OBJECTS

This invention relates to an apparatus for gripping the interior of a hollow object in order to manipulate it. More specifically, the invention relates to a device for interiorly gripping a tube in order to pull it out of a body in which it has become stuck.

FIGS. 37, 38, and 39 of Fermi et al. U.S. Pat. No. 2,708,656, dated May 17, 1955, disclose a nuclear reactor comprising graphite moderator blocks, aluminum coolant tubes extending through the blocks, and fuel elements in the tubes cooled by water flowing through the tubes and over and around the elements. If a leak forms in such a tube, it must be replaced. Frequently, the leak causes the tube to stick in the moderator because of the chemical action between water, aluminum and graphite. In the past, attempted removal of such a stuck tube has resulted in splitting or breaking of the tube into pieces, because a break or leak is present before the removal operation, or because the gripping of only a short forward region of the tube interior may cause the tube to neck down and fail in tension.

An object of the present invention is to provide a device for removing in one piece a stuck tubular or hollow object that may have a leak, break, or other weakness. The present device grips the object about its interior and uniformly throughout the length of the interior so that a large axial force may be applied to the object for dislodging it without tearing it or increasing the size of a break or leak present before the dislodging operation.

A further object is to provide a removing or dislodging device of the kind described in which a resilient element is expanded by pressure fluid to cause the device to grip the object to be dislodged.

Other objects will appear from the drawings in which:

FIG. 1 is a sectional view showing the novel gripping device of the present invention in place within a tube mounted in graphite moderator of a reactor;

FIG. 2 is a sectional view taken on the line 2—2 showing the device unexpanded so as to facilitate insertion within the tube;

FIG. 3 is a sectional view similar to FIG. 2, but showing the device expanded so as to grip the tube; and FIG. 4 is a sectional view showing how the device is used in removal of a tube.

The device of the present invention comprises an expandable tube 10 and a plurality of longitudinal wire cables 11 which are embedded in the outer circumference in spaced relation thereabout for internally gripping a metal tube 12 when the tube 10 is enlarged. Through an end fitting 14 attached to the wire cables 11, a pull is applied to the cables to facilitate moving the complete device together with the metal tube 12 in an axial direction.

The expandable tube 10, which may be of extruded rubber, has external longitudinal grooves in which the cables 11 are embedded so as to protrude slightly. The cables 11, which in the present embodiment are six in number, extend somewhat beyond one end of the expandable tube 10 so as to loop thereover and be joined to one another in pairs. This facilitates insertion of the tool in the metal tube 12 and prevents the cables 11 from accidentally being pulled out of the expandable tube 10 when it is contracted.

The end of the expandable tube 10, where the cables 11 are joined in pairs, is closed by a plug 15. The other end of the tube 10 is closed by a plug 16, to which is applied a valve 17 for admitting pressure fluid, such as air, to the expandable tube 10 to expand it. The ends of the cables 11 are well beyond the tube 10 and are embedded or otherwise attached in the fitting 14, which is well spaced from the tube 10, so that there is easy access to the valve 17 by a pressure line (not shown).

In the example shown, the metal tube 12 is an aluminum tube having two internal longitudinal ribs 18. The tube 12 is a reactor process or coolant tube, and the ribs are adapted to carry nuclear-fuel elements (not shown) cooled by water flowing through the tube 12. In addition to the tube and the unshown fuel elements, the reactor comprises a graphite moderator mass 19, which may take the form of blocks through which the tube 12 and other similar tubes 12, shown in FIG. 4, extend. The reactor also has front and rear shields 20 and 21, in which so-called gun barrels 22 are mounted to receive the end portions of the tube 12.

By expansion of the tube 10, the cables 11 are brought into engagement with the interior of the metal tube 12 at a large number of regions spaced about the interior of the tube 12 and each extending the length of the tube 12. Thus, when pull is applied to the cables 11 by the end fitting 14, this pull is transmitted to a large number of points of the tube 12 all along its length and about its interior. Because of this extensive and complete gripping of the tube 12 by the cables 11, the tube 12 is removed from the graphite 19 in one piece and without further damage. It will be observed in FIG. 3 that the expandable tube 10, being formed of rubber, accommodates itself to the internal ribs 18 by yielding to receive them upon being expanded. Since the ribs 18 are at the same level at the bottom of the tube 12 and are spaced from one another somewhat less than 120°, the cables 11 can be made to miss the ribs 18 by arranging the present device upon entry of the tube 12 so that diametrally opposed cables 11 be in a vertical plane.

FIG. 4 shows how the process tube 12 is to be handled after removal from the graphite mass 19. The end fitting 14 is pulled by a cable 23, which extends horizontally therefrom through a tubular receiver 24 to and through an eye 25 integral with a bolt 26 attached to a front wall 27 of the work area, which wall is well spaced from the reactor front shield 20. From the eye 25 the cable 23 extends downwardly to an apparatus (not shown) for applying pull to the cable. The tubular receiver 24 is supported on lines 28 carried by a crane (not shown). When the tube 12 is pulled out of the graphite mass 19 into the tubular receiver, the expandable tube 10 is deflated and contracts to release the cables 11 from their grip on the tube 12, as shown in FIG. 2.

It will be obvious that the present device is suitable for other uses than that of removing a reactor tube from a moderator, such other uses being, for example, removal and installation of tubes from and in tube sheets of a heat exchanger and the removal of a stuck well casing.

It is also understood that the invention is not to be limited by the details given herein but that it may be modified within the scope of the appended claims.

What is claimed is:

1. A device comprising a rubber tube closed at one end and having means at the other end for admitting pressure fluid to expand the rubber tube, and a plurality of parallel cables lodged in the exterior of the tube